3,369,504
BOILER OPERATION PROCESS TO PREVENT AIR POLLUTION
Thomas H. Oster, 156 S. Franklin,
Dearborn, Mich. 48124
No Drawing. Filed Feb. 23, 1965, Ser. No. 434,698
3 Claims. (Cl. 110—1)

This invention is directed to a process for alleviating the adverse effects caused by the emission of large quantities of sulphur dioxide by fuel burning apparatus such as boilers which use fuel containing sulphur. With the sole exception of natural gas, all commercial fuels contain sufficient sulphur compounds to give off objectionable amounts of sulphur dioxide in the stack gas.

This invention is predicated upon the fact that very finely divided or gaseous sodium chloride will react rapidly and completely with traces of sulphur trioxide to produce sodium sulphate and hydrogen chloride. The sodium sulphate is either a solid or a liquid and hence removes the sulphur trioxide from further effect on the sulphur dioxide, sulphur trioxide equilibrium. This permits more sulphur dioxide to be oxidized to sulphur trioxide provided sufficient excess air is available.

The sodium chloride in a very finely divided or gaseous form is supplied to the boiler gas stream by adding sodium chloride either to the incoming fuel, or to the boiler gas stream at a point such that the sodium chloride will be exposed to a temperature sufficiently high to result in the sodium chloride being volatilized to a significant extent. This gaseous sodium chloride or the very finely divided sodium chloride fog produced by the condensation of the gaseous sodium chloride will react very rapidly with the traces of sulphur trioxide which are present in all boiler gas.

This reaction may be written as

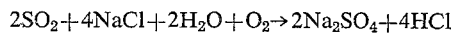

$$2SO_2 + 4NaCl + 2H_2O + O_2 \rightarrow 2Na_2SO_4 + 4HCl$$

Approximately stoichiometric amounts of sodium chloride should be employed as indicated by this equation. It is apparent that sufficient excess air must be supplied to yield the oxygen required by this equation.

In normal boiler operation the great bulk of the sulphur is oxidized only to sulphur dioxide despite the use of substantial amounts of air in excess of that necessary to react with all combustibles including the sulphur. This is because at boiler operating temperatures the equilibrium between sulphur dioxide and sulphur trioxide favors the formation of sulphur dioxide almost exclusively. To attain substantial amounts of sulphur trioxide requires temperatures far lower than those commercially employed. At these lower temperatures the rate of reaction is such that an inordinately long time would be required for the equilibrium to be attained.

The presence of gaseous sodium chloride or a sodium chloride fog in the boiler gas causes a very fast reaction to take place between the trace of sulphur trioxide existing in the boiler gas stream at equilibrium even at high temperatures. This reaction produces hydrogen chloride and sodium sulphate. The liquid or gaseous sodium sulphate removes the sulphur trioxide from the sphere of the reaction and causes further sulphur dioxide to react to give more sulphur trioxide. In this way the equilibrium which normally occurs in a boiler gas stream between sulphur dioxide and sulphur trioxide is upset with the result that a large portion of the sulphur is finally converted to sodium sulphate.

The sodium sulphate is non-volative at normal boiler temperatures and will be removed with the boiler ash. The hydrogen chloride is more susceptible to scrubbing from boiler gas than is sulphur dioxide. A simple water wash will serve to remove substantially all of the hydrogen chloride because of its intense solubility in water. It is, of course, apparent that the hydrogen chloride may be absorbed in lime or lime water or in a slurry of iron oxide if desired.

In many situations the effects of the hydrogen chloride may be less objectionable than the effects of an equivalent amount of sulphur dioxide so that the stack gas may be discharged to the atmosphere without the necessity of the removal of the hydrogen chloride.

I claim as my invention:

1. A process for diminishing the emission of sulphur dioxide from boilers during the burning of sulphur containing fuel comprising injecting sodium chloride into the gas stream passing through the boiler at a location which will result in the vaporization of a substantial portion of the sodium chloride, regulating the fuel to air ratio of the boiler so that sufficient excess air is present to oxidize the sulphur dioxide normally formed to sulphur trioxide, permitting the sulphur trioxide to react as it is formed with sodium chloride to form sodium sulphate and hydrogen chloride and removing the sodium sulphate and hydrogen chloride from the boiler gas stream.

2. A process for diminishing the emission of sulphur dioxide from boilers during the burning of sulphur containing fuel comprising injecting sodium chloride into the gas stream passing through the boiler at a location which will result in the sodium chloride being heated to a degree that the sodium chloride will exhibit a significant vapor pressure, regulating the fuel to air ratio of the boiler so that sufficient excess air is present to oxidize the sulphur dioxide normally formed to sulphur trioxide and permitting the sulphur trioxide to react as it is formed with the sodium chloride to form sodium sulphate and hydrogen chloride and removing the sodium sulphate and hydrogen chloride from the boiler gas stream.

3. A process for diminishing an emission of sulphur dioxide from boilers during the burning of sulphur containing fuel comprising incorporating sodium chloride into the boiler fuel whereby the heat of combustion vaporizes a substantial portion of the sodium chloride, regulating the fuel to air ratio of the boiler so that sufficient excess air is present to oxidize the sulphur dioxide normally formed to sulphur trioxide and permitting the sulphur trioxide to react as it is formed with the sodium chloride to form sodium sulphate and hydrogen chloride and removing the sodium sulphate and hydrogen chloride from the gas stream.

References Cited

UNITED STATES PATENTS

| | | |
|---|---|---|
| 896,875 | 8/1908 | Williams. |
| 1,377,363 | 5/1921 | Moon _____ 55—73 X |
| 2,537,558 | 1/1951 | Tigges _____ 122—421 X |
| 2,566,320 | 9/1951 | DeRoque _____ 110—1 |

OTHER REFERENCES

Bulletin 360, Removal of Soot, pub. 1932, U.S. Printing Office, pages 7 and 9.

FREDERICK KETTERER, *Primary Examiner.*